United States Patent Office.

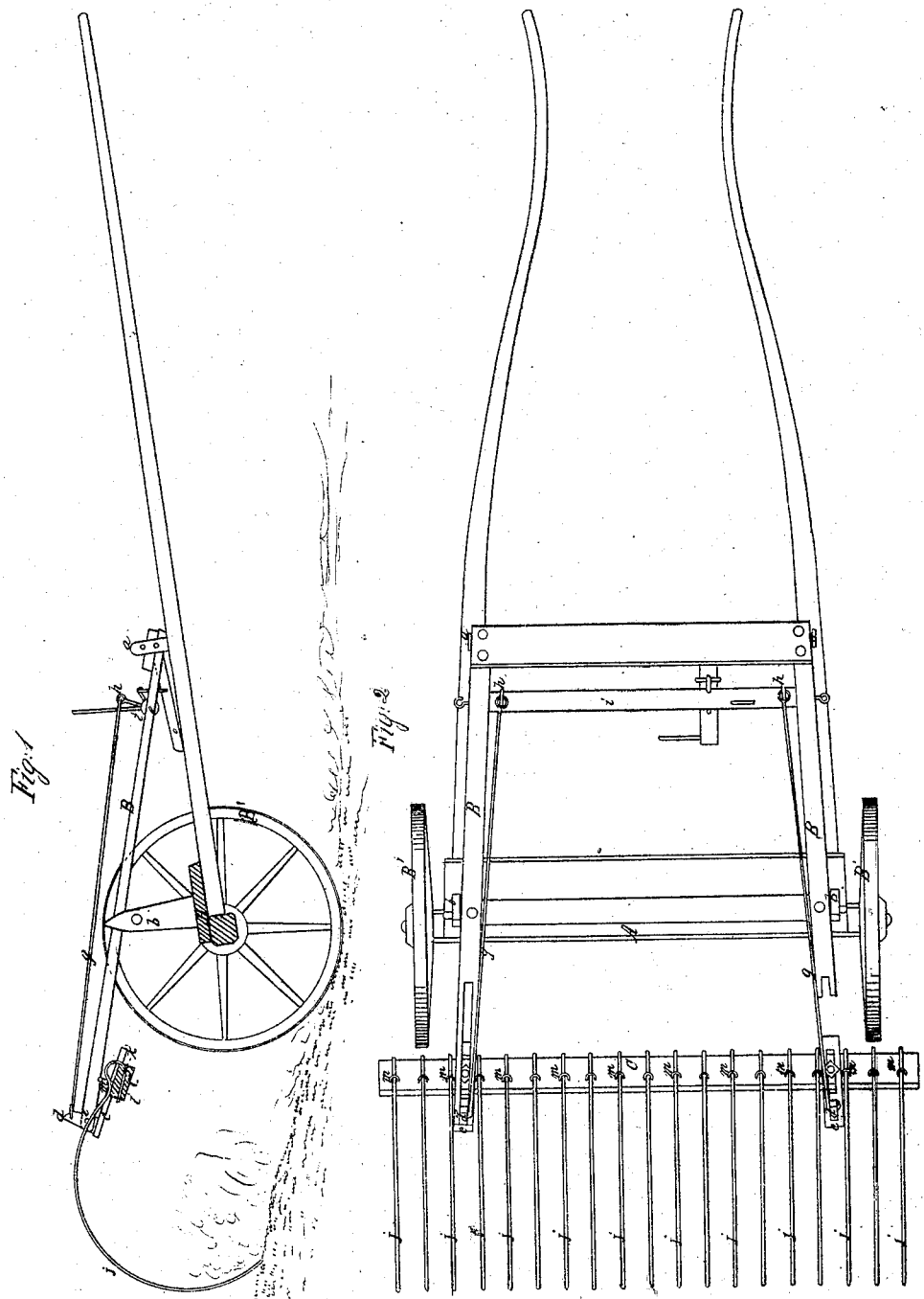

WILLIAM McCORD, OF SING SING, NEW YORK.

Letters Patent No. 74,924, dated February 25, 1868; antedated February 14, 1868.

---

IMPROVEMENT IN HORSE-RAKES.

---

The Schedule referred to in these Letters Patent and making part of the same.

---

TO ALL WHOM IT MAY CONCERN:

Be it known that I, WILLIAM McCORD, of Sing Sing, in the county of Westchester, and in the State of New York, have invented a new and useful Improvement in Horse-Rakes; and I do hereby declare that the following is a full, clear, and exact description thereof, which will enable those skilled in the art to make and use the same, reference being had to the accompanying drawing, forming part of this specification, in which drawing—

Figure 1 represents a sectional side view of a horse-rake made according to my invention.

Figure 2 is a plan.

Similar letters indicate corresponding parts.

This improvement consists in hanging the rake-head on adjustable arms, radiating from the same in such a manner that on raising the rake, the rake-head is caused to describe a circle in a downward and backward direction, and thereby the operation of discharging the hay from the rake-teeth is materially facilitated.

A represents a frame made of wood or any other suitable material, and supported by two wheels, B', as shown in the drawing. From the main frame, A, rises a secondary frame, B, which is placed in an oblique direction, rising from the thill or draught-pole towards the rake-head, and which is adjustable by means of standards $a$ $b$, so that the position of the rake in relation to the draught-pole or thill can be accommodated to the height of the draught-animal. C is the rake-head, which, instead of being hung so that it revolves around its own axis, is provided with radius arms, $c$, from the outer ends of which rise standards $d$, through which pass the pins $e$, connecting the rake-head with the secondary frame B. From the upper ends of the standards $d$ extend rods $g$ to arms $h$, which radiate from the rock-shaft $i$, and this rock-shaft is operated either by a hand-lever or treadle. By depressing the treadle or pulling on the hand-lever, the driver is enabled to raise the rake from the ground, and as the rake rises, the head C describes a circle in a downward and backward direction round the pins $e$ as the centres. By this downward and backward motion of the rake-head, the operation of discharging the hay from the rake is materially facilitated, since said head, on swinging down, strikes the hay and pushes it back from the teeth. No other device for clearing the teeth is required. The radius arms $c$ are adjustable on the rake-head by means of slots and set-screws or bolts, so that the sweep of said head can be increased or diminished at pleasure. The teeth $j$ are made of wire or other suitable material, and they form a regular curve of such a shape that their points, on coming in contact with an obstruction on the ground, are capable of springing back and up, and to clear such obstructions, without being liable to become injured or broken. The upper ends of the teeth are bent to form coils of one or more turns, and the rake-head is provided with notches, $k$, and holes $l$, to receive the ends of the teeth, as clearly shown in the drawing. By these means the teeth are firmly retained in position, and they can be readily taken out and re-inserted without much loss of time. The teeth are further strengthened in their position by staples $m$, which are secured in the rake-head as shown, and which prevent the teeth from being turned sideways, while they allow them sufficient play in a vertical direction to enable them to clear any obstruction with which they may come in contact.

By these means a simple, cheap, and durable horse-rake is obtained, which is readily adapted to draught-animals of different height, and which is not liable to get out of repair.

What I claim as new, and desire to secure by Letters Patent, is—

The radius arms $c$, made adjustable on the rake-head C, and operating in combination with said rake-head, substantially as and for the purpose set forth.

WM. McCORD.

Witnesses:
W. HAUFF,
GEO. F. SOUTHERN.